Patented June 16, 1953

2,642,383

UNITED STATES PATENT OFFICE 2,642,383

CATALYTIC REFORMING OF HYDROCARBONS

Charles V. Berger, Western Springs, and Vladimir Haensel, Hinsdale, Ill., assignors to Universal Oil Products Company, Chicago, Ill., a corporation of Delaware No Drawing. Application May 20, 1949,
Serial No. 94,498

7 Claims. (Cl. 196—50)

This invention relates to the catalytic conversion of hydrocarbon fractions containing naphthenes and paraffins. It is more specifically concerned with a particular method of reforming straight-run gasolines and naphthas in the presence of hydrogen and platinum-alumina-halogen catalysts.

Catalysts comprising platinum, alumina, and halogen, particularly fluorine and chlorine, are especially useful in the reforming of hydrocarbons. Hydrocracking and isomerization of paraffins and dehydrogenation of naphthenes are among the principal reactions that are promoted by these catalysts, which are capable of increasing the octane number of straight-run gasolines and naphthas to values that are substantially higher than those that ordinarily can be reached by thermal reforming. In addition, the yield-octane number relationships realized with these catalysts are much better than are the corresponding relationships obtained in thermal reforming and in most of the prior catalytic reforming processes. By an appropriate selection of operating conditions, this catalyst can be used for a number of weeks and even months without regeneration. However, the activity of the catalyst gradually decreases with use due chiefly to the deposition of carbonaceous material thereon. It is believed that part of the deactivation also is caused by the presence of traces of impurities in the feed, which have a deleterious or poisoning effect on the catalyst. At any event, as the activity of the catalyst declines it is necessary to compensate therefor if a product of constant quality is desired. In any given plant, the most direct and inexpensive method of compensating usually comprises increasing the reaction temperature. However, when this is done, it has been found that hydrocracking is promoted to a greater extent than is the dehydrogenation reaction. Consequently the balance between these reactions is destroyed and greater losses to light gases as well as greater consumption of hydrogen is encountered because of the relatively greater proportion of hydrocracking. We have invented a method of controlling the relative amounts of hydrocracking and dehydrogenation, and, in particular, we have invented a method of suppressing the tendency toward increased hydrocracking as the reaction temperature is increased.

In one embodiment our invention relates to an improvement in the reforming of a hydrocarbon fraction comprising paraffins and naphthenes by subjecting the same to the action of a catalyst comprising platinum, alumina, and halogen in the presence of hydrogen at reforming conditions, said improvement comprising controlling the degree of hydrocracking by regulating the partial pressure of water in the reforming zone.

In a more specific embodiment our invention relates to a reforming process which comprises continuously contacting hydrogen and a normally liquid hydrocarbon fraction containing paraffins and naphthenes and boiling below about 425° F. with a catalyst comprising platinum, alumina, and combined halogen at a temperature of from about 750° F. to about 1000° F. and a pressure greater than about 250 p. s. i. a., increasing the reaction temperature at intervals to compensate for loss in catalyst activity, and concurrently increasing the water content of the reaction mixture to maintain the amount of hydrocracking substantially constant.

In another specific embodiment our invention relates to a reforming process which comprises heating a normally liquid hydrocarbon fraction containing paraffins and naphthenes and boiling below about 425° F. to a temperature within the range of from about 750° F. to about 1000° F., continuously passing the heated hydrocarbon fraction together with hydrogen in series flow through a plurality of substantially adiabatic reaction zones containing catalyst comprising platinum, alumina, and combined halogen, heating the hydrogen and hydrocarbons passing between said zones, increasing the reaction temperature as the catalyst loses activity, and concurrently increasing the water content of the charge to the reaction zones.

As pointed out above, an especially useful embodiment of our invention comprises the use of water to suppress the tendency toward increased hydrocracking as the reaction temperature is raised during the course of a reforming run employing a platinum-alumina-halogen catalyst. However, our invention is of broader scope than this particular embodiment. In a broad aspect, our invention relates to the use of water, or compounds which liberate water under the conditions of reaction, in the reforming of hydrocarbons to control the balance between the various reactions promoted by the platinum-alumina-halogen catalyst. For example, it might be desirable in some types of operation to use a catalyst containing a rather appreciable amount of halogen in order to obtain a high degree of isomerization. However, such a catalyst would be impractical in an ordinary reforming operation, because it would induce too much hydrocracking and thus lower the yield of liquid product. In addition, high halogen catalysts deactivate at a rapid rate, probably due to an increased rate of hydrogen transfer reactions, which result in the formation of highly unsaturated tar and coke on the catalyst. By the use of our invention, such high-halogen catalysts can be used with benefit in the reforming of hydrocarbons without the disadvantages just enumerated. By correlating the amount of water or compound decomposable to water, charged to the reforming zone, with the halogen content of the catalyst and the other operating variable, the relative extent of the various reactions can be controlled to a large degree. In this example, the amount of hydrocracking can be substantially independently regulated by water addition with little effect on the other reactions. Thus, the use of water or equivalent compounds permits greater flexibility in catalyst compositions with concomitant benefits in catalyst life and product quality. In general, a relatively dry feed will be used with catalysts containing small amounts of halogen and feeds of higher water content will be used with catalysts containing larger amounts of halogen.

Another useful application of our invention is in the production of aromatics by the dehydrogenation of stocks consisting essentially of naphthenes using a catalyst of the type herein described. The water suppresses hydrocracking of the naphthenes and thus makes possible major yields of aromatics.

The hydrocarbon stocks that will be converted in accordance with our process comprise hydrocarbon fractions containing naphthenes and paraffins. The preferred stocks are those consisting essentially of naphthenes and paraffines, although in some cases aromatics also may be present. This preferred class includes straight-run gasolines, natural gasolines, and the like. The gasoline may be a full boiling range gasoline having an initial boiling point within the range of from about 50° to about 100° F. and an end boiling point within the range of from about 325° to about 425° F., or it may be a selected fraction thereof which usually will be a higher boiling fraction, commonly referred to as naphtha, and generally having an initial boiling point within the range of from about 125° to about 250° F. and an end boiling point within the range of about 350° F. to about 425° F.

The catalysts comprising platinum, alumina, and halogen that are preferred for use in our hydrocarbon reforming process may contain substantial amounts of platinum, but, for economic as well as for product yield and quality reasons, the platinum content usually will be within the range of from about 0.05% to about 1.5%. The catalyst will contain a relatively minor amount, usually less than about 3% on a dry alumina basis, of a halogen, especially fluorine or chlorine. One method of preparing such catalysts comprises adding a suitable alkaline reagent such as ammonium hydroxide or carbonate to a salt of aluminum, such as aluminum chloride, aluminum sulfate, aluminum nitrate, and the like, in an amount sufficient to form aluminum hydroxides, which upon drying, are converted to alumina. The halogen may be added to the resultant slurry in the form of an acid such as hydrogen fluoride or hydrogen chloride, or as a voltaile salt such as ammonium fluoride or ammonium chloride.

A satisfactory method of adding platinum to the alumina-halogen composite comprises preparing a colloidal suspension of platinic sulfide by introducing hydrogen sulfide into an aqueous solution of chloroplatinic acid until said solution reaches a constant color, which usually is a dark brown. The resultant colloidal suspension of platinic sulfide is commingled with the aluminum hydroxide slurry at room temperature followed by stirring to obtain intimate mixing. The resulting material is then dried at a temperature of from about 200° to about 400° F. for a period of from about 4 to about 24 hours or more to form a cake. This material may then be converted into pills or other shaped particles. Thereafter the catalyst may be subjected to a high temperature calcination or reduction treatment prior to use. It is to be understood that the foregoing method of preparing satisfactory platinum-alumina catalysts is merely illustrative and is not to be taken in a limitative sense inasmuch as various other methods may be employed to produce satisfactory catalysts of this type.

The exact manner in which the halogen or halide ion is present in the catalyst is not known, although it is believed to be present in the form of a chemical combination or loose complex with the alumina, and/or platinum components. Because the exact chemical constitution of such halogen-containing catalysts is not known, we sometimes refer to them as "catalysts comprising platinum, alumina, and halogen" or "catalysts comprising platinum, alumina, and combined halogen."

In the operation of our process, water or steam may be added in the required amounts to the charging stock or they may be added directly to the reaction zone. If desired, compounds that liberate water under the conditions prevailing in the reaction zone may be used in place of water. Compounds of this type include oxygen and certain alcohols such as t-butyl alcohol, peroxides, hydroperoxides, and phenols. In general, we prefer to use water because of its low cost and because the use thereof does not introduce contaminating organic radicals into the reaction mixture. In order to achieve accurate control, it frequently is desirable to prefractionate the hydrocarbon charging stock to remove dissolved water, oxygen, and oxygenated compounds therefrom and thereafter to add to the fractionated charge stock the desired amount of water or equivalent compound. If this procedure is followed the partial pressure of water in the reaction zone can be very closely regulated since it is not influenced by variable amounts of water and the like in the charging stock. Instead of drying the charging stock by fractionation, it might be desirable in some cases to accomplish the same result by passing the charging stock at an elevated temperature through a bed of activated alumina or similar desiccant.

Hydrocarbons may be reformed in accordance with our process using fluidized, fluidized-fixed bed, suspensoid, and moving bed types of processes. However, we prefer to use fixed bed processes, primarily because processes of this type tend to minimize attrition losses of the relatively expensive catalyst. One fixed bed method of utilizing our invention comprises preheating hydrogen and hydrocarbon charge stock to a conversion temperature, and passing the same in admixture with the requisite amount of water vapor through a plurality of substantially adiabatic reaction zones containing platinum-alumina-halogen catalyst. In all but the last stages, the reaction is endothermic, hence the reactant streams passing between the reaction zones are reheated to the desired temperature. The reformed hydrocarbons are recovered, and the hydrogen is separated and recycled to the reaction zone. Another type of fixed bed process that is particularly suitable for certain types of operation comprises passing the hydrocarbon charging stock together with hydrogen and the requisite amount of water through tubes containing catalyst, said tubes being subjected to radiant heat from a radiant flame and the resulting hot products of combustion. Here again, the reformate is recovered and the hydrogen is separated and recycled to the reaction zone.

Hydrocarbon reforming operations carried out in accordance with our invention ordinarily will be conducted at temperatures of from about 750° F. to about 1000° F. At temperatures in the vicinity of 750° F. and lower, the aromatic-naphthene equilibrium is unfavorable, the reaction rates are quite low, and very low space velocities must be employed to obtain appreciable conversion. At temperatures in excess of 1000° F. a significant amount of thermal reaction takes place accompanied by a poorer liquid recovery and more rapid catalyst deactivation.

The pressures at which our process will be conducted will lie within the range of from about 50 to about 1200 pounds per square inch; a total pressure of at least 250 pounds ordinarily is preferred. The weight hourly space velocity, which is defined as the weight of hydrocarbon charged per hour per weight of catalyst in the reaction zone, should lie within the range of from about 0.2 to about 40. The amount of hydrogen charged along with the hydrocarbons usually will be from about 0.5 to about 15 mols per mol of hydrocarbon.

The following examples are given to illustrate our invention, but it is to be understood that they are given for illustrative and not for limitative purposes.

Example I

A 54.0° API, 190–398° F. Gulf Coast, straight-run naphtha was reformed at 700 p. s. i. g., 2.0 liquid hourly space velocity, and 6:1 hydrogen/hydrocarbon molal ratio in the presence of a catalyst comprising alumina containing 0.3% platinum and 0.3% fluorine. The charge was passed in series through three adiabatic reaction zones containing the catalyst. The inlet temperatures to the zones were adjusted to give a product with an F-2 octane number with 3 ccs. TEL/gal. of about 90. Typical results of the run are shown in the following table:

| Period No | 1 | 2 | 15 | 16 |
|---|---|---|---|---|
| Hours on Stream | 115 | 146 | 821 | 870 |
| Catalyst Bed Inlet Temperatures, °F.: | | | | |
| Bed No. 1 | 946 | 946 | 960 | 960 |
| Bed No. 2 | 924 | 923 | 941 | 941 |
| Bed No. 3 | 904 | 903 | 921 | 925 |
| Octane Number: | | | | |
| F-1 Clear | 85.3 | 85.2 | 84.3 | 83.6 |
| +3 cc. TEL/Gallon | 94.5 | 94.6 | 94.6 | 94.2 |
| F-2 Clear | 78.3 | 78.3 | 78.6 | 78.0 |
| +3 cc. TEL/Gallon | 89.1 | 89.4 | 90.0 | 89.7 |
| Reformate Yield, Vol. percent Charge | 93.0 | 94.2 | 91.2 | 91.8 |
| Aromatics in Product, Wt. percent Chg | 38.7 | 37.7 | 36.4 | 33.5 |
| Yields: | | | | |
| Hydrogen, Wt. percent Charge | 0.92 | 0.88 | 0.53 | 0.39 |
| $C_1$, Mols/100# Charge | .054 | .046 | .076 | .079 |
| $C_2$, Mols/100# Charge | .037 | .043 | .077 | .081 |
| $C_3$, Mols/100# Charge | .075 | .077 | .122 | .120 |
| $C_4$, Mols/100# Charge | .100 | .112 | .100 | .109 |
| $C_5$, Mols/100# Charge | .108 | .118 | .127 | .120 |
| $C_6+$, Mols/100# Charge | .764 | .765 | .743 | .744 |
| Total Mols Hydrocarbons/100# Charge | 1.138 | 1.161 | 1.245 | 1.253 |
| Increase, Mols Hydrocarbons/100# Charge | .245 | .268 | .352 | .360 |

Periods 1 and 2 represent tests made at the beginning of the run, and periods 15 and 16 represent tests made near the end of this run. It can be seen that it was necessary to increase the catalyst temperatures substantially as the run progressed to compensate for the decrease in catalyst activity, i. e., higher temperatures were required at the end of the run to produce a reformate of the same antiknock quality as that produced at lower temperatures at the start of the run. Further, it can be seen that on the average the gasoline yield over the course of the run declined about 2% and the hydrocracking as measured in terms of molal increase of hydrocarbons increased about 25%. The increase in the production of gaseous hydrocarbons was accompanied by a decrease in the net production of hydrogen. Other work has shown that a point is reached at which hydrogen consumption is encountered. At this point the process is no longer self-sustaining; if extraneous hydrogen is not added to the system the nonregenerative characteristic of the process is destroyed and catalyst carbon formation increases at a rapid rate until the catalyst has lost substantially all of its activity. Thus the need for a method of suppressing hydrocracking as the reaction temperature is raised during the course of a reforming run using the type of catalyst indicated, is clearly shown.

Example II

The following data showing the effect of water addition were obtained in a continuation of the run described under Example I.

| Period No | 18 | 20 | 21 | 22 |
|---|---|---|---|---|
| Hours on Stream | 1,070 | 1,147 | 1,234 | 1,266 |
| Mols $H_2O$/Mol of Hcbn. Charge | 0 | 0.0137 | 0.206 | 0.222 |
| Catalyst Bed Inlet Temps., °F.: | | | | |
| Bed No. 1 | 970 | 970 | 970 | 968 |
| Bed No. 2 | 958 | 958 | 952 | 966 |
| Bed No. 3 | 962 | 962 | 930 | 965 |
| Temperature Drop Through Catalyst Beds, °F.: | | | | |
| Bed No. 1 | 4 | 7 | 41 | 38 |
| Bed No. 2 | ¹8 | ¹7 | 16 | 14 |
| Bed No. 3 | ¹3 | ¹1 | 19 | (²) |
| Reformate Yield, Vol. Percent of Charge | 92.3 | 94.0 | 95.8 | 95.3 |
| Hydrogen Production, Cu. Ft. Per Bbl. of Charge | −158 | −143 | 58 | 196 |
| Methane Production, Cu. Ft. Per Bbl. of Charge | 111 | 77 | 25 | 52 |
| Aromatics in Product, Wt. Percent of $C_6+$ Product | 35 | 33 | 32 | 39 |
| Percent of Liquid Product Boiling Up to 212° F. in an ASTM Distillation | 46.0 | 44.0 | 26.5 | 34.0 |
| Octane Numbers of Reformate: | | | | |
| F-1 Clear | 77.5 | 76.5 | 71.4 | 78.0 |
| F-1+3ccs. TEL/Gal | 90.6 | 89.1 | 87.0 | 91.0 |
| F-2 Clear | 72.9 | 71.8 | 67.7 | 73.5 |
| F-2+3 ccs. TEL/Gal | 85.7 | 85.8 | 82.6 | 86.0 |

¹ Temperature increase.
² Not determined because of failure of thermocouples.

It can be seen that the addition of water selectively suppressed the hydrocracking without noticeably affecting the aromatization reaction. This is shown in part by the temperature increases or drops through the catalyst beds. These temperature differentials between the inlets and outlets are the net effect of the exothermic hydrocracking reaction and the endothermic aromatizing reaction. In periods 18 and 20, in which hydrocracking predominated, the drop in bed No. 1 was slight, and increases were obtained in beds 2 and 3. On the other hand, in periods 21 and 22, appreciable temperature drops were obtained in all three beds, which indicates that the water repressed the hydrocracking. This is borne out by the data on hydrogen and methane production, aromatic content of the liquid product, and per cent over a 212° F. in the ASTM distillation. With the particular charging stock, catalyst, and operating conditions employed, the data indicates that the water addition must be greater than about 1.5 mol per cent of the hydrocarbon charge in order to appreciably affect the hydrocracking activity.

It should be remembered, however, that this catalyst was rather highly carbonized and that with a fresh catalyst of the same composition, a different amount of water might be required to produce the same effect.

*Example III*

The effect of water concentration in the feed was investigated when processing a Pennsylvania straight-run naphtha, at 835° F., 500 pounds pressure, a hydrogen/hydrocarbon ratio of 2.8, and a liquid hourly space velocity of 2.0 in the presence of a fresh catalyst comprising alumina containing 0.3% platinum and 0.28% fluorine. The data are shown in the following table:

| Water in Feed, Wt. Percent | 0.004% (Saturation at about 50° F.) | t-Butyl Alcohol Corresponding to: | |
|---|---|---|---|
| | | 0.07% $H_2O$ | 0.20% $H_2O$ |
| Aromatics in Product, Wt. Percent Charge | 33.5 | 32.4 | 32.7 |
| Percent i$C_4$ in Total $C_4$ | (¹) | (¹) | (¹) |
| Increase, Mols Hydrocarbons/100# Charge | .152 | .121 | .100 |

¹ Approximately 35%.

From these data it can be seen that about 0.07 weight per cent water (ca. 0.5 mol %) water or its equivalent, reduced the hydrocracking activity about 25%. Isomerization was not affected, as shown by the isobutane content of the $C_4$ fraction.

It is possible to ascertain whether the amount of water being added to the charging stock in a multiple adiabatic reactor system is correct by observing the total temperature drop through the reactors. For example, if a fresh catalyst is giving a satisfactory product distribution at a given total $\Delta T$, then the amount of water added as the run progresses and the reaction temperature is increased should be such as to hold the total $\Delta T$ essentially constant. If this procedure is followed, the ratio between hydrocracking and aromatization will be held substantially constant and, consequently, the product distribution will remain approximately the same as that experienced early in the run.

It is evident to one skilled in the art that this is only an approximation however. If a substantial change in heat capacity of the material in the reaction zone has taken place by such means as a variation in the ratio or the composition of the recycle gas, this fact should also be taken into account. In that case the more accurate procedure would be to keep the product of heat capacity and $\Delta T$ substantially constant in order that the ratio between hydrocracking and aromatization be maintained substantially constant.

From the foregoing it can be seen that we have invented an improvement in the reforming of hydrocarbons in the presence of platinum-alumina-halogen catalysts which results in better yields and longer catalyst life and permits a greater degree of flexibility both in the composition of the catalyst and in the relative amounts of the hydrocarbon reactions that are obtained.

We claim as our invention:

1. In a reforming process wherein a normally liquid hydrocarbon fraction containing paraffins and naphthenes boiling below about 425° F. is passed with hydrogen and at reforming conditions through a catalyst comprising platinum, alumina and combined halogen to effect hydrocracking of paraffins and dehydrogenation of naphthenes, and wherein the extent of said hydrocracking tends to increase in the later stages of the processing period, the method of maintaining the extent of hydrocracking substantially constant over said processing period which comprises introducing $H_2O$ to the reforming zone during the later stages, at least, of the processing period and regulating its partial pressure to suppress said increased tendency toward hydrocracking.

2. In a reforming process wherein a normally liquid hydrocarbon fraction containing paraffins and naphthenes boiling below about 425° F. is passed with hydrogen and at reforming conditions through a catalyst comprising platinum, alumina and combined halogen to effect hydrocracking of paraffins and dehydrogenation of naphthenes, and wherein the extent of said hydrocracking tends to increase with increasing temperature and decreasing catalyst activity, the method of maintaining the extent of hydrocracking substantially constant over an extended time interval, including the period of reduced catalyst activity, which comprises introducing $H_2O$ to the reforming zone during said period of reduced catalyst activity and regulating its partial pressure to suppress said increased tendency toward hydrocracking.

3. In a reforming process wherein a normally liquid hydrocarbon fraction containing paraffins and naphthenes boiling below about 425° F. is passed with hydrogen and at reforming conditions through a catalyst comprising platinum, alumina and combined halogen to effect hydrocracking of paraffins and dehydrogenation of naphthenes, and wherein the activity of the catalyst declines with continued passage of the hydrocarbons therethrough, the method which comprises increasing the reforming temperature at intervals to compensate for reduced catalyst activity, whereby the extent of said hydrocracking tends to increase, and increasing the water content of the reaction mixture with increasing temperature to suppress said increased tendency toward hydrocracking.

4. The process of claim 1 further characterized in that the initial stages of said processing period are performed in the absence of added water and in that water is added to said hydrocarbon fraction during said later stages.

5. The process of claim 2 further characterized in that the reforming is effected in the absence of added water prior to said period of reduced catalyst activity.

6. The process of claim 1 further characterized in that said $H_2O$ is introduced to the reforming zone in the form of water in admixture with the hydrocarbon fraction to be reformed.

7. The process of claim 1 further characterized in that said $H_2O$ is formed in situ in the reforming zone from a compound which liberates water under the reforming conditions.

CHARLES V. BERGER.
VLADIMIR HAENSEL.

References Cited in the file of this patent

UNITED STATES PATENTS

| Number | Name | Date |
|---|---|---|
| 2,131,089 | Beeck et al. | Sept. 27, 1938 |
| 2,398,674 | Schulze | Apr. 16, 1946 |
| 2,400,363 | Meier | May 14, 1946 |
| 2,433,603 | Danner et al. | Dec. 30, 1947 |
| 2,479,110 | Haensel | Aug. 16, 1949 |